United States Patent
Llamas Sandin

(10) Patent No.: US 8,474,747 B2
(45) Date of Patent: Jul. 2, 2013

(54) PIVOTING STABILISING SURFACE FOR AIRCRAFT

(75) Inventor: Raul Carlos Llamas Sandin, Aranjuez (ES)

(73) Assignee: Airbus Operations, S.L., Getafe (ES)

( * ) Notice: Subject to any disclaimer, the term of this patent is extended or adjusted under 35 U.S.C. 154(b) by 182 days.

(21) Appl. No.: 12/710,849

(22) Filed: Feb. 23, 2010

(65) Prior Publication Data

US 2011/0147517 A1 Jun. 23, 2011

(30) Foreign Application Priority Data

Dec. 17, 2009 (ES) .................... 200931185

(51) Int. Cl.
*B64C 5/14* (2006.01)
*B64C 1/26* (2006.01)

(52) U.S. Cl.
USPC .............................. 244/46; 244/87

(58) Field of Classification Search
USPC ............... 244/87, 91, 117 R, 39, 218, 46, 49, 244/7 A, 3.27–3.29
See application file for complete search history.

(56) References Cited

U.S. PATENT DOCUMENTS

| | | | |
|---|---|---|---|
| 2,160,089 A | | 5/1939 | Schairer |
| 3,737,121 A | * | 6/1973 | Jones ............................. 244/46 |
| 3,971,535 A | * | 7/1976 | Jones ............................. 244/46 |
| 5,154,370 A | * | 10/1992 | Cox et al. .................... 244/3.28 |
| 5,992,796 A | * | 11/1999 | Smith ............................. 244/46 |
| 2005/0211827 A1 | * | 9/2005 | Barocela ........................ 244/46 |

FOREIGN PATENT DOCUMENTS

| | | |
|---|---|---|
| DE | 2426061 | 5/1974 |
| FR | 435 033 | 12/1910 |

OTHER PUBLICATIONS

International Search Report dated Sep. 6, 2012 in the Spanish Patent Application No. 200831185.

* cited by examiner

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

An aircraft (1) horizontal stabilizer (2) which can vary its sweep angle (6) by rotating around an essentially vertical axis (4) with respect to the direction of flight of the aircraft (1) when the aircraft (1) is in flight at high speeds, close to the speed of sound, this axis (4) being contained in the plane of symmetry of the aforementioned aircraft (1), the aforementioned horizontal stabilizer (2) being is a single and structurally continuous component such that it does not transmit a bending moment to the fuselage (14) structure of the aircraft (1), which permits it to be of reduced weight, such that the horizontal stabilizer (2) rotates in a single way and a single direction around the axis (4) to achieve the sweep angle (6) required for high-speed flight.

9 Claims, 4 Drawing Sheets

PIVOTING STABILISING SURFACE FOR AIRCRAFT

FIELD OF THE INVENTION

This invention relates to a stabilising surface for aircraft, in particular to a horizontal stabiliser that pivots as a function of the speed of the aircraft.

BACKGROUND OF THE INVENTION

Current aircraft, which operate at speeds close to the speed of sound, need to overcome a series of problems associated with flying at that speed. Hence, as the aircraft approaches the speed of sound, a rapid rise occurs in aerodynamic resistance over the aircraft, due to the effect of the compressibility of the air, at the same time as a loss of lift of the aircraft occurs along with a change in its pitching moment, which can affect its stability and controllability.

The critical speed at which the aforementioned compressibility effects occur increases, at the same time as the indicated adverse effects are minimised, if the aircraft's lift and stabilising surfaces are designed with a high sweep angle. The sweep of the aircraft's aerofoil and stabilising surfaces, or the inclination of these surfaces in the direction of flight is, therefore, a design characteristic for aircraft which fly at speeds close to the speed of sound and is motivated by aerodynamic considerations.

The aerodynamic advantage of the sweep lies in the fact that the adverse effects of compressibility, produced by the overspeed of the current over the aerodynamic profile, which increase with the relative thickness of this profile, are related to the component essentially perpendicular to the line of 50% of the chord of the surface of the air current incident on the aircraft. Therefore, for a given airspeed, an aerodynamic surface profile with a given sweep will be subject to compressibility effects equivalent to those of a profile with no sweep but with a profile of a thickness equal to the cosine of the sweep angle. A greater relative profile weight will result in lower structural weight of the aerofoil as the internal loads produced by the aerodynamic loads are reduced due to the increased girder of the structure. However, in high-speed flight, characteristic of modern large commercial aircraft, aerodynamic profiles with high relative thicknesses lead to the adverse effects from air compressibility, which can come to exhibit themselves as shock waves on these profiles, with the associated increase in aerodynamic resistance and other adverse phenomena for flight. Therefore, the sweep of the aircraft's aerofoil and stabilising surfaces serves to achieve a design compromise between the structural weight of these surfaces and their acceptable behaviour in flight at speeds close to the speed of sound.

The first aeroplane built for high-speed flight with a significant sweep angle was the Junkers 287 in 1945. Among other unusual features of this aeroplane, it can be highlighted that the sweep angle of the wings is negative, i.e. the wingtips are forward in the direction of flight with respect to the wing root, or connection of the wings to the fuselage. Except for very rare exceptions, such as the MBB/HFB 320, the Grumman X-29 and the Sukhoi 47, all with wings with negative sweep, the great majority of high-speed aeroplanes have been built with wings with positive sweep.

The effects of the sweep angle on the aerofoils are beneficial for high-speed flight, as described above. However, in low-speed flight phases, particularly during takeoff and initial ascent, as well as final approach and landing, aerofoils with high sweep angles have a greater tendency to lift stall at lower angles of attack than for aerofoils with no sweep. This is particularly a problem in the case of the wings, which require complex devices for high lift, such as the so-called flaps, to improve aerodynamic characteristics at low speed. In the case of the stabilisers, the need to incorporate sweep for flight at high speed results in lower efficiencies at low speed, which need to be compensated by increasing the area, and hence weight, of the aforementioned stabilisers. Additionally, the sweep in the stabilisers has the effect of reducing the lift force gradient with the angle of attack, which reduces the effectiveness as a stabilising surface on producing less force for a given wash angle.

Aircraft designs are known with aerofoils (wings) with high positive sweeps (of up to 60°) and with relative thicknesses not greater than 0.06:1. These designs are appropriate for aircraft flight at speeds close to and above the speed of sound, but they raise problems in flight at low speed required, for example, for takeoff and landing of the aircraft. Hence, aircraft designed with high sweep angles for high-speed flight, close to the speed of sound, would need to land or take off at much higher speeds than the same aircraft, but designed with conventional aerofoils (wings), with no sweep, or they would need to have aerofoils (wings) with a very high relative thickness, with the consequent increase in aircraft weight and resistance.

Due to this, as has been mentioned, the characteristics required for aircraft aerofoil (wing) profiles for high speed are contrary to those required for low speeds. Aircraft designs are known for which the sweep of the aerofoils is variable depending on the speed of the aforementioned aircraft, such as is the case, for example, of documents U.S. Pat. No. 4,569,493 and U.S. Pat. No. 5,984,231.

A small number of aeroplanes have made use of the concept of variable wing sweep, generally implemented such that each half-wing can pivot independently, but simultaneously, with respect to the fuselage, varying its sweep angle according to flight condition. This concept has been used in military aeroplanes such as the Grumman F-14, General-Dynamics F-111, Panavia Tornado, Mig-23, Mig-27, etc, as well as in some civil designs, such as the Boeing SST 2707, which was cancelled before being built.

However, on very rare occasions the concept described has been used for variable sweep for aircraft stabilising surfaces, such as in the Tupolev 144, where the horizontal stabilising surface is located in the front part of the fuselage, in front of the main aerofoils (canard-type configuration) and is also of variable geometry. In some aircraft configurations in which the sweep of the aerofoils is variable, such as those described in the documents U.S. Pat. No. 4,569,493 and U.S. Pat. No. 5,984,231, for example, the stabilising surfaces or control surfaces vary their sweep with the aerofoils, as the stabilising surfaces are arranged in the former, moving together with them. The problem with this configuration is that the control surfaces are less efficient aerodynamically, hence they need to be larger, which negatively affects aircraft weight. On the other hand, these control surfaces have geometric limitations imposed on them by the sweep angle of the aerofoils on which they are located.

According to the configuration of the aircraft described in document GB 664,058, which is considered to be the closest document to the above technique, this aircraft comprises aerofoils (wings) with variable sweep, as well as comprising tail stabilising surfaces also with variable sweep to increase the lift at the tail of the aforementioned aircraft, such that the sweep angle these tail stabilising surfaces adopt is in the same direction and of approximately the same magnitude as that adopted by the aerofoils or wings. With the above variable sweep configuration, the aircraft is capable of adapting to the necessary and conflicting requirements for flight at high and low speed. However, a configuration of this type raises problems inasmuch as each of the tail stabilising surfaces transmits bending moments to the connection point on the aircraft fuselage on which they are located. So, the fuselage needs to support very high bending moments, hence it needs to be designed in such a way as to be sufficiently resistant to support these moments, which makes the weight of the aircraft high, this being an especially undesirable characteristic for aircraft. Additionally, the mechanism which makes each tail stabilising surface rotate is very complex.

An alternative way of obtaining a variable sweep aerofoil configuration consists of making the complete wing pivot with respect to the fuselage around a vertical axis. This configuration is known as oblique wing and has only been employed experimentally in an aeroplane at full size in the case of the NASA Dryden D-1. The use of variable sweep horizontal stabilising surfaces with the pivoting configuration in the style of the oblique wing is unknown, however, in any aeroplane, including those mentioned previously with variable sweep wings.

From the description of the favourable and adverse effects of the sweep angle in the aerofoils and, in particular, in the stabilising surfaces, it is gathered that sweep angle is desirable for high-speed flight, but reduces the effectiveness of the stabilisers at low speed. Therefore, it would be desirable to be able to set the optimum sweep for the stabilisers for each phase of flight, according to aircraft flight speed, without incurring the complexity and weight associated with the known solutions for sweep variation mechanisms.

This invention is aimed at overcoming the aforementioned problems.

SUMMARY OF THE INVENTION

As such, this invention relates to the field of aircraft stabilising surfaces, developing, in particular, a horizontal stabilising configuration which has a single variable sweep angle. The advantageous effects provided by the sweep angle in the stabilising surfaces, as per that stated previously, are obtained for both positive sweep angles (where the tips of the stabilising surfaces are behind their roots) and for negative sweep angles (where the tips of the stabilising surfaces are in front of their roots). As such, the invention's horizontal stabiliser comprises a mechanism which enables it to be rotated or pivoted in its entirety around a vertical axis with respect to the aircraft's direction of flight and contained in the aircraft's plane of symmetry, it being possible in this way to vary its sweep angle when the aircraft is flying at high speeds.

Additionally, the complete horizontal stabiliser can rotate by means of the previously mentioned mechanism around an essentially horizontal axis perpendicular to the aircraft's plane of symmetry when this horizontal stabiliser is in the zero sweep configuration (basically takeoff and landing cases) and what will be referred to hereinafter as the "longitudinal reference axis of the stabiliser", such that it is possible to vary its aerodynamic angle of attack to carry out its function of aircraft stabiliser and control surface in these cases.

The invention's mechanism for configuring the horizontal stabiliser simultaneously permits the rotation of the aforementioned stabiliser around a vertical axis with respect to the aircraft's direction of flight and around the longitudinal reference axis of the stabiliser.

In an embodiment of this invention, the structural connection of the horizontal stabiliser to the aircraft is made to the vertical stabiliser, such that the vertical axis of rotation is housed in a fitting which comprises some bearings, this fitting being solidly connected to the aforementioned vertical stabiliser.

In another embodiment of this invention, the structural connection of the horizontal stabiliser to the aircraft is made on the fuselage, for which an opening is made in this fuselage which permits the rotations of the horizontal stabiliser around the vertical axis and around the longitudinal reference axis of the stabiliser.

The configuration of the horizontal stabiliser of the invention has the main advantage with respect to known configurations, in which the horizontal stabiliser has a fixed sweep angle, that greater efficiency is obtained as a stabilising surface at low speed when the sweep angle is zero, mainly on takeoff and landing of the aircraft, such that the air flows perpendicularly to the longitudinal reference axis of the stabiliser. In this configuration, the variation in lift with each degree of increase in aerodynamic angle of attack, or efficiency of the stabilising surface, is the maximum possible for the given stabilising surface, according to its planform. Therefore, in this case, the aerodynamic restoring force for a longitudinal perturbation of the aeroplane is optimum for the given planform, which theoretically enables the total area of the stabilising surface to be reduced with respect to a stabilising surface which is equivalent in aerodynamic terms, but with a fixed sweep, generally set for high-speed flight criteria.

For high-speed flight, where the sweep angle needs to increase to avoid compressibility effects, the stabilising surface of this invention will rotate around the vertical axis to the required sweep angle. In this flight condition, due to the greater dynamic pressure of the air, the efficiency required as a stabilising surface (variation in lift with each degree increase in aerodynamic angle of attack) is not as high as at low speed. Therefore, the configuration of the pivoting or oblique stabilising surface of this invention enables the whole area of the stabilising surface to be optimised without needing to resolve a compromise situation due to the choice of the sweep angle as in the known configuration in which the horizontal stabiliser has a fixed sweep.

Likewise, the invention's horizontal stabiliser configuration enables the stabiliser to rotate around its longitudinal reference axis to carry out its function as a control surface, unlike the known configuration of the stabilising surface with fixed sweep, in which the control function is carried out by means of the control surfaces and not the full stabiliser due precisely to the geometric limitations imposed by the fixed sweep angle and to the larger size of the control surface due to its lower aerodynamic efficiency. The function of aerodynamic trimming or balancing of the aircraft in flight, appertaining to the horizontal stabilising surfaces themselves, is also carried out by means of the rotation of the horizontal stabiliser of this invention around its longitudinal reference axis.

Additionally, the invention's horizontal stabiliser mechanism which enables it to rotate in its entirety both around the vertical axis and around the longitudinal reference axis is a rather uncomplicated mechanism, especially if it is compared with the mechanisms used in variable sweep configurations in which the surfaces on each side pivot independently.

Essentially, the main characteristics of the horizontal stabiliser of the invention, with respect to the documents for the known previous technique and, in particular, with respect to that considered to be the closest previous technique, are those stated below:

the horizontal stabiliser of the invention is single and structurally continuous across its whole span, which enables it to have reduced weight with respect to known horizontal stabilisers (which are segmented), thanks to the reduction in the loads the aforementioned horizontal stabiliser transmits to the aircraft fuselage, given that the bending moment produced by the aerodynamic loads is balanced internally in the stabiliser structure itself and is not transmitted to the fuselage;

the horizontal stabiliser as per the invention rotates with a single sweep angle in a single direction, with respect to the vertical axis, which is the consequence of its continuous structural design: what is important aerodynamically is the absolute value of the sweep angle, regardless of whether this sweep angle is positive or negative, or whether it is obtained by means of a continuous stabiliser as per the invention or by means of segmented stabiliser parts, as occurs in those using the known technique; however, the stabiliser design as per the invention, at the same time as obtaining aerodynamic advantages analogous to known stabilisers, represents a great advantage over these thanks to the reduction in weight and the simplicity of the mechanism which enables it to rotate;

the mechanism which rotates the horizontal stabiliser as per the invention is of great mechanical simplicity with respect to those needed in the previous known technique, comprising two shafts essentially perpendicular to each other which only transmit forces to the aircraft fuselage and not bending moments, which again results in the reduction in weight of the stabiliser as per the invention.

Other characteristics and advantages of this invention will emerge from the detailed description which follows from an illustrative embodiment of its subject in relation to the accompanying figures.

DETAILED DESCRIPTION OF THE INVENTION

Figure 1:
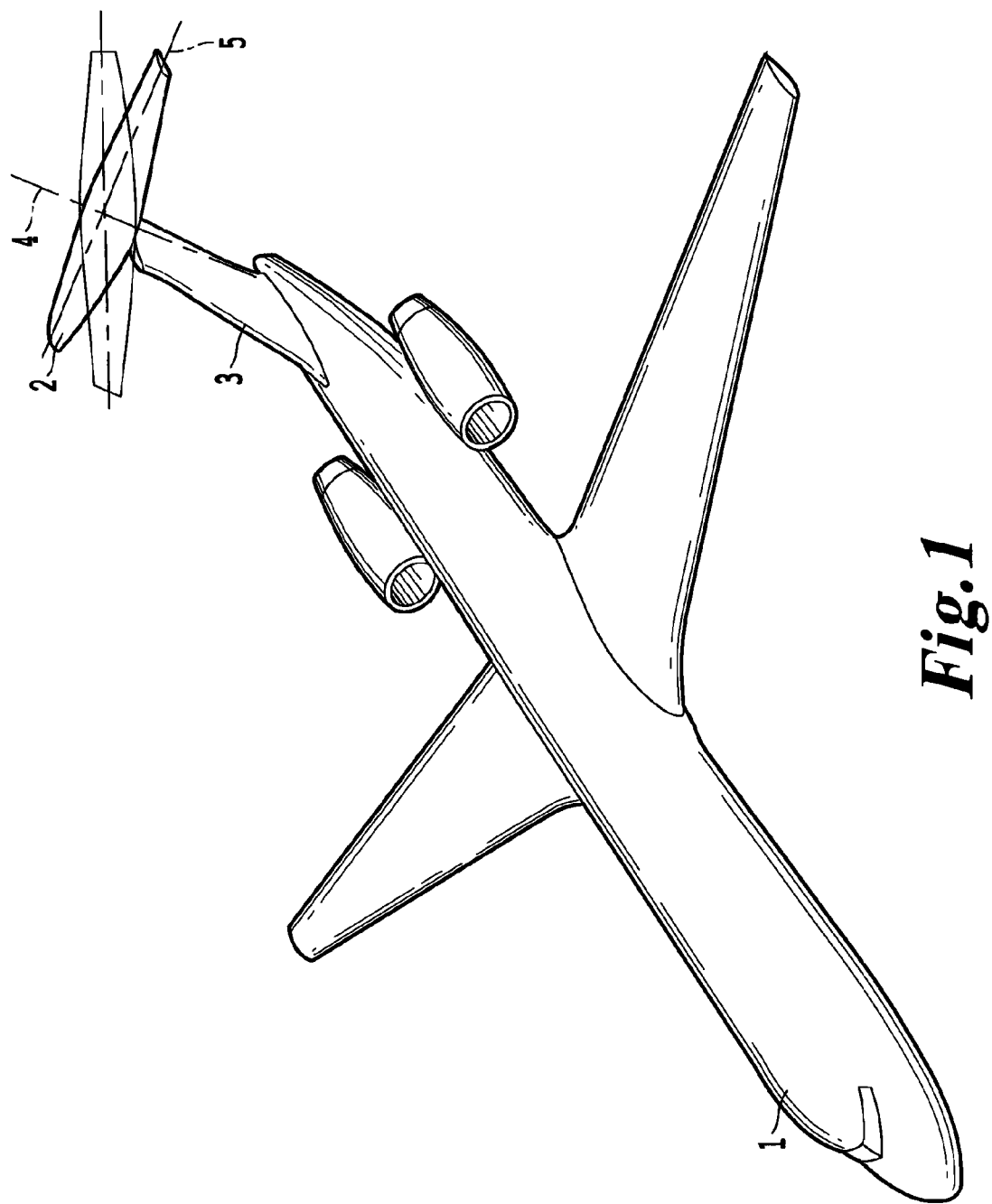
FIG. 1 shows a schematic perspective view of an aircraft which comprises a pivoting stabilising surface as per a first embodiment of this invention.
Figure 2:
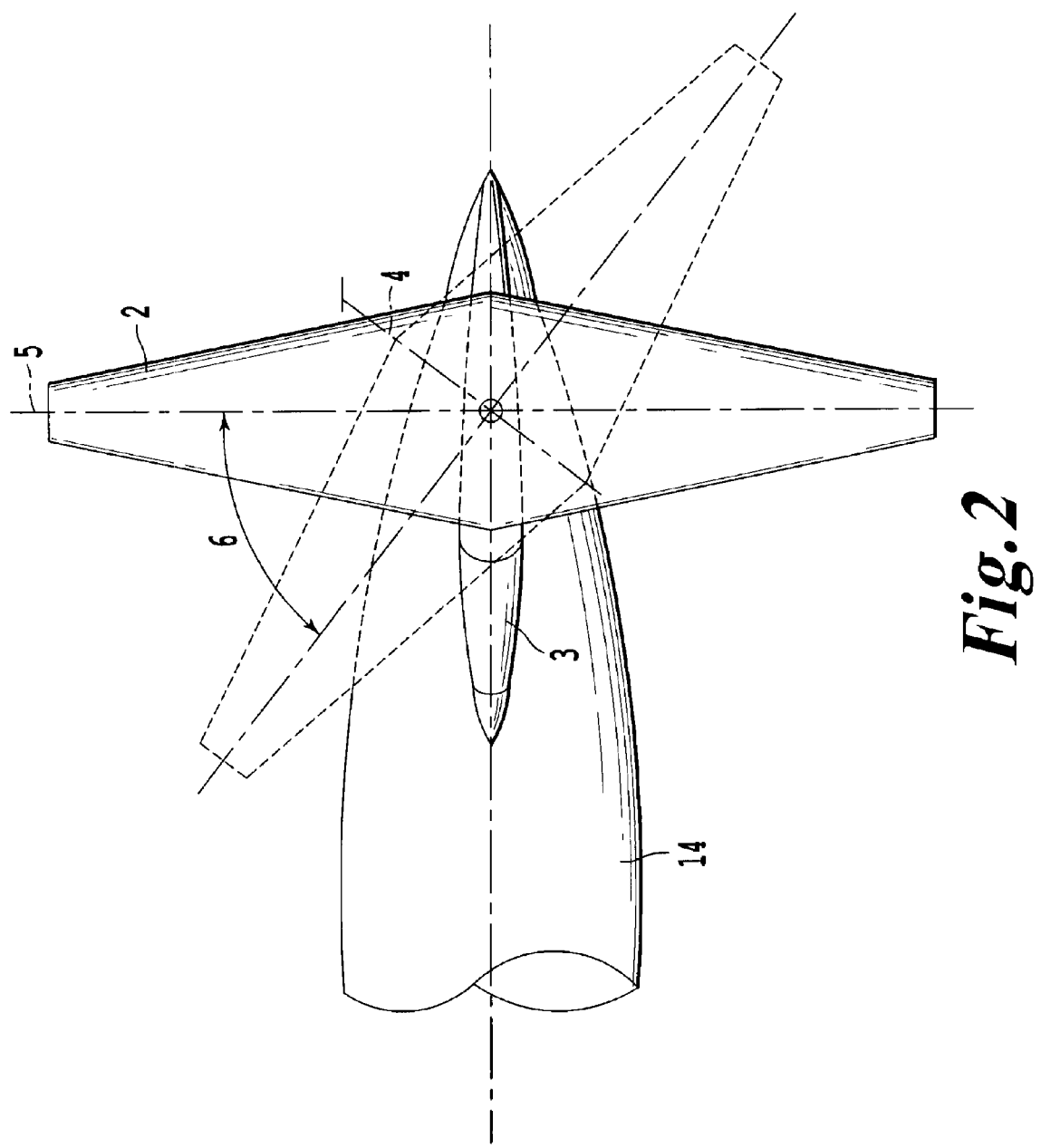
FIG. 2 shows a schematic plan view of the rear part of an aircraft which comprises a pivoting stabiliser surface as per a first embodiment of this invention.
Figure 3:
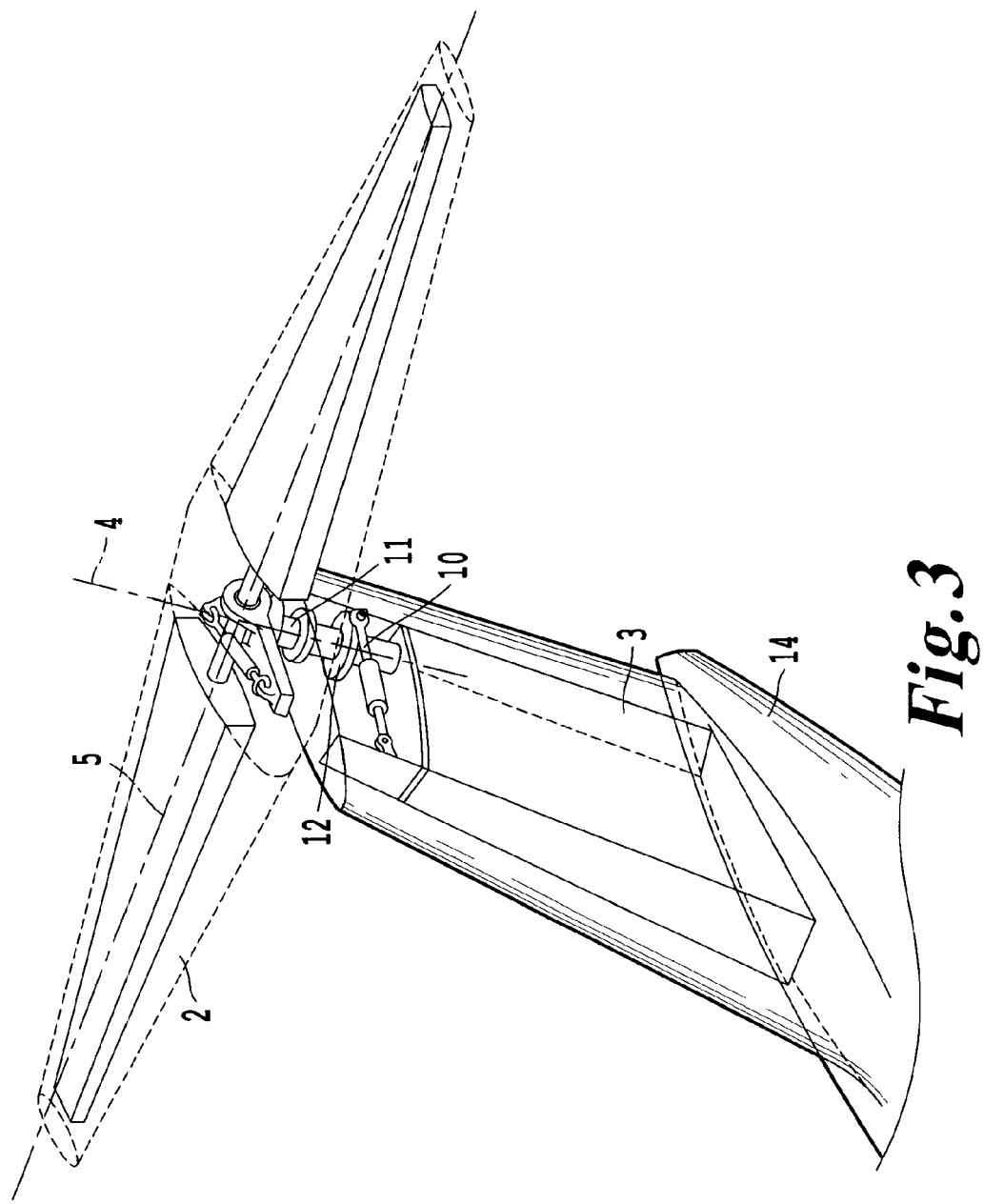
FIG. 3 shows a detailed view in perspective of the mechanism enabling rotation around a vertical axis and rotation around the longitudinal reference axis of a pivoting stabiliser surface as per a first embodiment of this invention.
Figure 4:
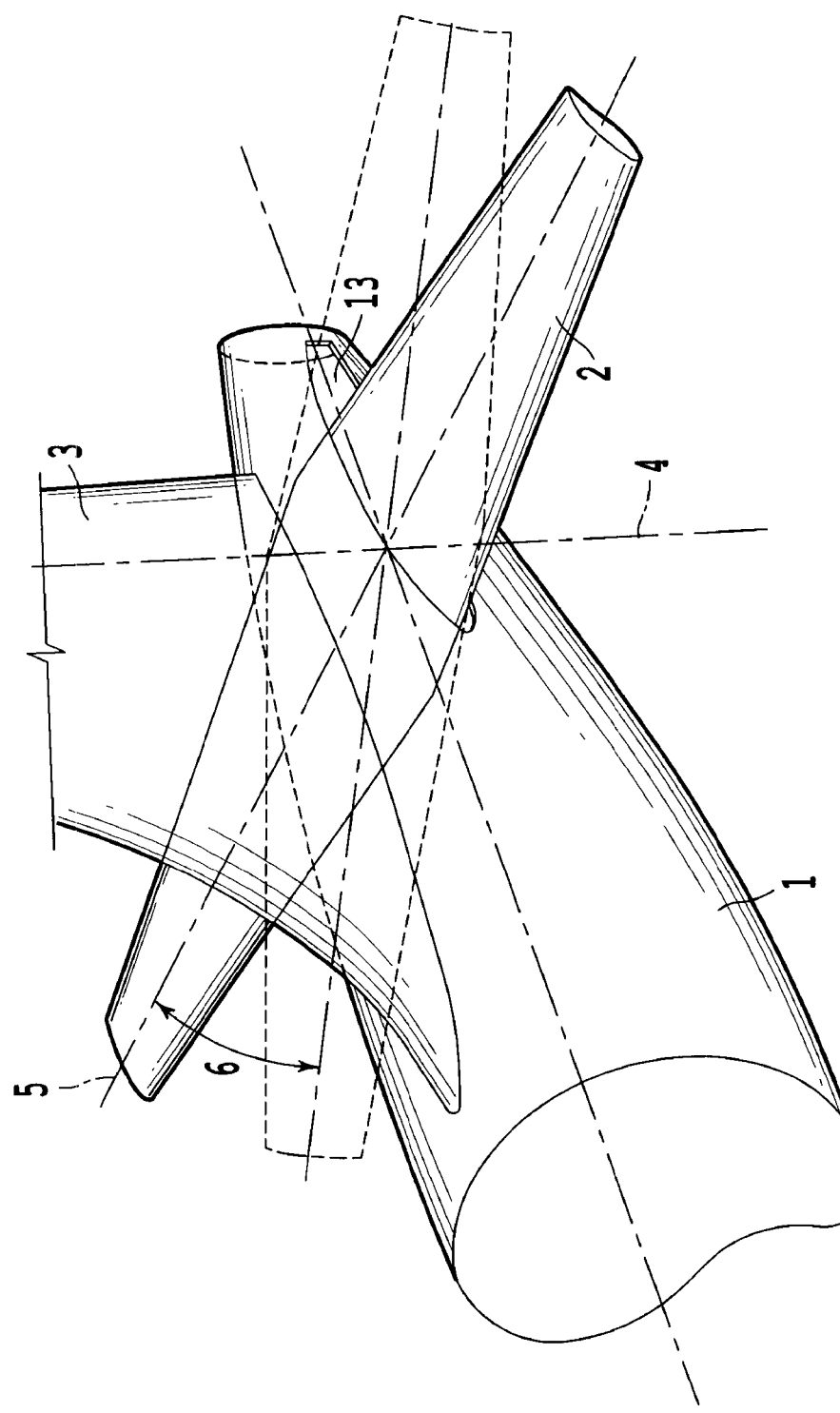
FIG. 4 shows a schematic perspective view of the rear part of an aircraft which comprises a pivoting stabilising surface as per a second embodiment of this invention.

This invention develops a horizontal stabiliser 2 configuration for aircraft 1 which has a single variable sweep angle 6. As such, the invention's horizontal stabiliser 2 comprises a mechanism 10 which enables it to be rotated or pivoted around a vertical axis 4 with respect to the aircraft's 1 direction of flight and contained in the plane of symmetry of the aforementioned aircraft 1, it being possible in this way to vary its sweep angle 6 when the aircraft 1 is flying at high speeds, close to the speed of sound.

Additionally, the complete horizontal stabiliser 2 can rotate by means of the previously mentioned mechanism 10 around an essentially horizontal axis perpendicular both to the aircraft's plane of symmetry and the vertical axis 4 when this horizontal stabiliser 2 is in the zero sweep configuration (basically takeoff and landing cases) and what will be referred to hereinafter as the "longitudinal reference axis 5 of the stabiliser 2", such that it is possible to vary the aerodynamic angle of attack of the horizontal stabiliser 2 to carry out its function of aircraft stabiliser and control surface in the aforementioned cases.

The invention's mechanism 10 for configuring the horizontal stabiliser 2 simultaneously permits rotations of the aforementioned stabiliser 2 around the vertical axis 4 with respect to the aircraft's 1 direction of flight and around the longitudinal reference axis 5 of the stabiliser 2.

In an embodiment of this invention, the structural connection of the horizontal stabiliser 2 to the aircraft is made to the vertical stabiliser 3, such that the vertical axis of rotation 4 is housed in a fitting 11 which comprises some bearings 12, this fitting 11 being solidly connected to the aforementioned vertical stabiliser 3.

In another embodiment of this invention, the structural connection of the horizontal stabiliser 2 to the aircraft 1 is made directly onto the aircraft fuselage 14, for which an opening 13 is made in this fuselage which permits the rotations of the horizontal stabiliser 2 around the vertical axis 4 and around the longitudinal reference axis 5 of the stabiliser 2.

In the configuration of the horizontal stabiliser 2 as per the invention, according to any of the previous embodiments, greater efficiency is obtained as a stabilising surface at low speed when the sweep angle 6 is zero (takeoff and landing of the aircraft 1) as the air flows perpendicular to the longitudinal reference axis 5 of the aforementioned stabiliser 2.

For high-speed flight, where the sweep angle 6 needs to increase to reduce compressibility effects, the stabilising surface 2 of this invention rotates around its vertical axis 4 to the required sweep angle 6. In this flight condition, due to the increased dynamic pressure of the air, the efficiency required from the aforementioned surface 2 as a stabilising surface is not as high as at low speed.

Additionally, the configuration of the horizontal stabiliser 2 as per the invention permits the rotation of the aforementioned stabiliser 2 around its longitudinal reference axis 5 to carry out its function as a control surface. The function of aerodynamic trimming or balancing of the aircraft 1 in flight, appertaining to the horizontal stabilising surfaces themselves, is carried out in this way by means of the rotation of the horizontal stabiliser 2 around its longitudinal reference axis 5.

The mechanism 10 for the horizontal stabiliser 2, which enables it to rotate in its entirety both around the vertical axis 4 and around the longitudinal reference axis 5, is a similar mechanism to those used currently in aeronautical applications, as has been described.

As such, the main advantages of the invention's horizontal stabiliser 2 can be summarized as follows:

the horizontal stabiliser 2 is a single and structurally continuous component, permitting it to be of lower weight than known variable sweep stabilisers, due to the reduction of the loads the aforementioned stabiliser 2 transmits to the fuselage 14 structure of the aircraft 1;

the horizontal stabiliser 2 rotates with a single sweep angle 6 and in a single direction, with respect to the vertical axis 4, which is the consequence of the continuous structural design of the stabiliser 2: what is relevant for aerodynamic purposes is the absolute value of the sweep angle 6, as has been shown in wind tunnel tests and is reflected in the technical literature, regardless of whether this sweep angle is positive or negative, or whether it is obtained by means of a continuous stabiliser 2 or by means of segmented stabiliser parts, as occurs in those using the known technique; however, the stabiliser 2 design as per the invention, at the same time as obtaining aerodynamic advantages analogous to known stabilisers, represents a great advantage over these thanks to the reduction in weight and the simplicity of the mechanism 10 which enables it to rotate;

the mechanism 10 which makes the invention's horizontal stabiliser rotate is mechanically simpler with respect to those necessary in the previous known technique, comprising two shafts essentially perpendicular to each other, such that the aforementioned longitudinal reference axis 5 rotates around the vertical axis 4 on varying the sweep angle 6 of the stabiliser 2 by means of the operation of the mechanism 10, in those cases in which the stabiliser 2 carries out only the function of varying the sweep angle 6, such that the mechanism 10 only transmits aerodynamic and inertial forces and moments to the fuselage 14 of the aircraft 1, but does not transmit bending moments internal to the stabiliser 2, as this stabiliser 2 is structurally continuous across its span, enabling the weight of this stabiliser and the fuselage to be reduced.

Those modifications comprised within the scope defined by the following claims may be introduced to the embodiments described above.

The invention claimed is:

1. An aircraft horizontal stabilizer, located at a tail of the aircraft, configured to vary its sweep angle by rotating around an essentially vertical axis with respect to the direction of flight of the aircraft when the aircraft is in flight at high speeds, close to the speed of sound, the vertical axis being contained in the plane of symmetry of the aircraft, wherein the horizontal stabilizer is a single piece and structurally continuous such that it does not transmit a bending moment to the fuselage structure of the aircraft, which permits the horizontal stabilizer to be of reduced weight, such that the horizontal stabilizer rotates in a single way and a single direction around the vertical axis to achieve the sweep angle required for high-speed flight, the horizontal stabilizer is also configured to rotate around a longitudinal reference axis, the longitudinal reference axis is essentially horizontal and perpendicular to both the plane of symmetry of the aircraft and the vertical axis, and a middle portion of the horizontal stabilizer is completely surrounded by the fuselage.

2. The horizontal stabilizer according to claim 1, wherein in cases in which the horizontal stabilizer is in a zero sweep angle configuration, varying the aerodynamic angle of attack of the horizontal stabilizer in this way so that it carries out its function as a stabilizer and control surface for the aircraft.

3. The horizontal stabilizer according to claim 2, further comprising a mechanism which permits the horizontal stabilizer to rotate both around the vertical axis in performing the function of varying the sweep angle and rotate around the longitudinal reference axis in performing its function as a stabilizing control surface simultaneously, the mechanism including two shafts which are essentially perpendicular to each other, such that the longitudinal reference axis rotates around the vertical axis on varying the sweep angle of the horizontal stabilizer by means of actuating the mechanism in those cases in which the horizontal stabilizer performs the function of varying the sweep angle.

4. The horizontal stabilizer according to claim 3, in which the mechanism only transmits aerodynamic and inertial forces and moments to the fuselage of the aircraft, not transmitting bending moments internal to the horizontal stabilizer as the horizontal stabilizer is structurally continuous across its span.

5. The horizontal stabilizer according to claim 4, in which the structural connection of the horizontal stabilizer to the aircraft is made directly on the aircraft fuselage.

6. The horizontal stabilizer according to claim 5, wherein an opening located in the body of the fuselage permits rotations of the horizontal stabilizer around the vertical axis and around the longitudinal reference axis of the horizontal stabilizer.

7. The horizontal stabilizer according to claim 6, wherein the opening is oval-shaped.

8. The horizontal stabilizer according to claim 4, in which the structural connection of the horizontal stabilizer to the aircraft is made to a vertical stabilizer of the aircraft.

9. The horizontal stabilizer according to claim 8, in which the vertical rotation axis is housed in a fitting which includes some bearings, the fitting being solidly connected to the vertical stabilizer.

* * * * *